Aug. 10, 1954     A. L. SEGELHORST ET AL     2,685,891
AUTOMATIC FLUID CONTROL MEANS
Filed June 7, 1948
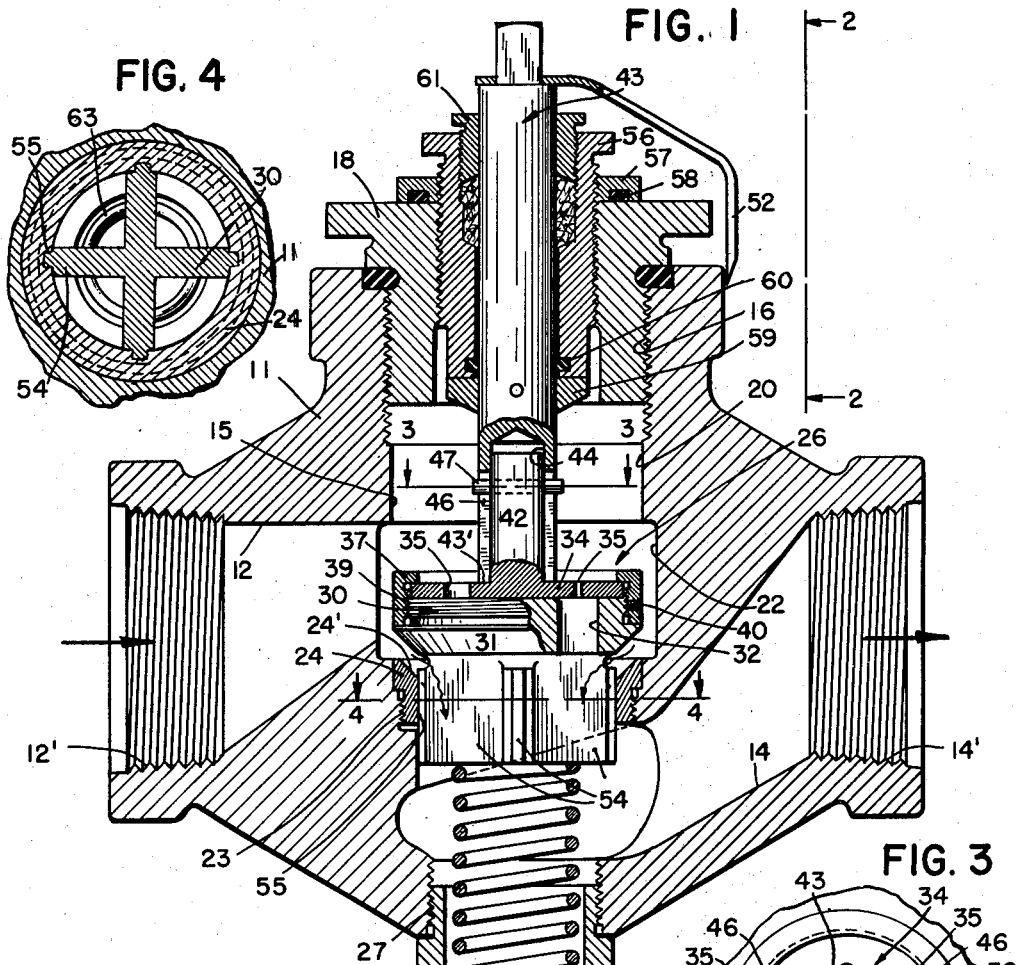
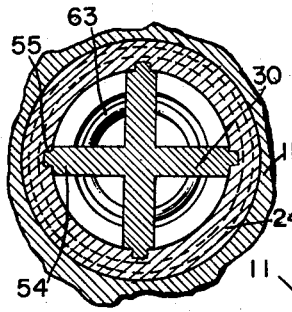
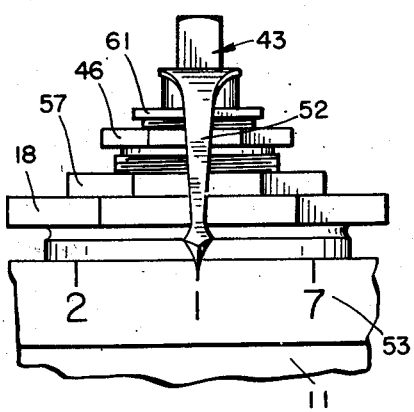
INVENTORS
AUGUST L. SEGELHORST
WARREN W. STOKES
BY
*Mason & Graham*
ATTORNEYS Patented Aug. 10, 1954

2,685,891

UNITED STATES PATENT OFFICE 2,685,891

AUTOMATIC FLUID CONTROL MEANS

August L. Segelhorst and Warren W. Stokes, Taft, Calif.

Application June 7, 1948, Serial No. 31,473

2 Claims. (Cl. 137—614.16)

This invention has to do with fluid regulator or control devices generally, and more particularly is in the nature of a valve which is automatically responsive to fluid pressure to regulate the flow of fluid whereby the effective cross sectional area available for fluid flow is reduced under conditions of high pressure and whereby the area is increased when pressure drops below predetermined limits.

While the invention disclosed herein may have numerous other applications, the invention is particularly designed for use in connection with producing oil wells as a means for controlling and regulating the flow of fluid from a well to maintain a desired ratio of oil and gas in a flowing or pumping well. It is well known that in wells which flow under the influence of natural gas pressure it is necessary to regulate or check the flow of fluid from the well in order to obtain maximum output of oil with relation to the gas produced or, in other words, to maintain an efficient ratio of oil to gas in the fluid produced. If the well is allowed to flow too fast the gas is apt to channel the oil sands, bring sand into the well, and escape without performing its useful function of raising the optimum quantity of oil. On the other hand, if the flow of fluid from the well is checked or maintained at too low a rate, there is a danger of the well overloading; that is, there will come to be too large a proportion of oil or water in the well which has not absorbed or is not mixed with a sufficient quantity of gas to lighten the column of fluid with the result that in many cases the well will fail to flow at reduced bottom hole pressures. It is also known, of course, that the bottom hole pressures in a well vary greatly from time to time, and the well often surges as a result of sudden influxes of gas or oil under high pressure. In view of this it is therefore necessary from time to time to adjust the rate of flow in order to compensate for the changing conditions in the well.

It is also desirable to regulate the flow of fluid from wells being pumped in order to maintain a relatively constant flow and prevent intermittent flow which might otherwise take place.

An object of this invention is to provide means for automatically controlling the flow of fluid from a well in response to changes in pressure of the fluid in order to maintain the well in production at the desired ratio of oil to gas.

A particular object of the invention is to provide a device adapted to be connected in a pipe line or the like which will permit only limited flow of fluid under conditions of high pressure and which will offer less resistance to flow of fluid when the pressure in the pipe line drops below a predetermined point. In this connection, an object is to provide a device in the nature of a valve which is adjustable to present an orifice of desired dimensions for flow of fluid therethrough under given pressure conditions and which automatically opens when the pressure drops in order to permit a balanced flow. A further object is to provide, in such a device, means for adjusting the maximum flow permitted.

It is a further object of the invention to provide a fluid control means which at all times provides a relatively small orifice for the flow of fluid therethrough and which is responsive to changes in pressure to vary the effective orifice gradually, depending upon the pressure to which the device is subjected.

More particularly it is an object to provide a valve having a valve element and means for resiliently urging the element to an open position in which the valve element, when closed, permits limited flow of fluid therethrough and which, when open, offers less restriction to flow.

It is also an object to provide a valve of this type which has means for adjusting the valve element so as to vary the passage or orifice through which the fluid flows when the valve is closed.

These and other objects will be apparent from the drawings and following description thereof. Referring to the drawings:

Fig. 1 is a sectional view through a valve device embodying the invention;

Fig. 2 is a fragmentary elevational view of a portion of the device of Fig. 1 as taken on the line 2—2 of Fig. 1;

Fig. 3 is a section on line 3—3 of Fig. 1;

Fig. 4 is a sectional view on line 4—4 of Fig. 1.

More particularly describing the invention, reference numeral 11 generally indicates a valve body which is provided with an inlet passage 12 and an outlet passage 14. These passages may be provided with internal screw threads 12' and 14' respectively, to receive a pipe, pipe fitting or the like.

The valve body 11 is provided with a central or axially extending bore generally indicated by numeral 15, the upper end of which is screw threaded at 16 to receive a plug 18. Below the screw threaded portion 16 is a cylindrical section 20 and below this an enlarged fluid chamber 22 which may be considered a continuation of the inlet passage 12. Below chamber 22 is a screw threaded section 23 which receives a valve seat 24 against which a valve element, generally indicated by 26, is adapted to seat. The lower end of the bore 15 is also provided with a screw threaded section 27 which receives a spring housing 28 which will be described later.

It is a particular feature of the fluid regulator that it provides for a constant flow of fluid from the inlet to the outlet. Under conditions of high pressure this flow is through a reduced or limited opening in the valve and preferably the valve includes means whereby the effective cross sectional area of the opening may be adjusted. Under conditions of lower pressure the valve element 26 is adapted to open and provide a larger opening or orifice for flow of fluid.

To accomplish the above, the valve element 26 is provided with a seating surface 31 adapted to mate with a corresponding surface 24' on the valve seat 24. The valve element 30 is provided with a bleeder passage 32 for the flow of fluid therethrough. In order to control the effective cross sectional area of this passage, the valve element is provided with an adjustable disk 34 which has several ports 35 of different sizes. The disk 34 is mounted on top of the valve element and retained in place by an annular collar 37 threadedly mounted at 39. A set screw 40 may be provided for preventing relative movement between the collar and the body.

In order to provide for adjustment of the disk 34 from a point exteriorly of the valve body, the plate is provided with an upstanding shank 42 which is received within a valve stem 43, the lower end of the valve stem being provided with a cylindrical recess 44 for this purpose. Any suitable means may be provided for preventing relative rotation of the valve disk 34 and valve stem 43 while at the same time permitting free axial movement of the valve element. In the form of the invention shown this means comprises a pair of slots 46 in the lower end of the valve stem and a pin 47 mounted in the shank 42 of the valve plate, the pin having projecting ends which slidably fit within the slots 46.

The valve stem may be provided with a pointer 52 adapted to cooperate with a scale 53 on the valve body to provide a sensible indication of the position of the disk 34.

The valve element 26 is adapted to have limited vertical movement within the valve body 11. The lower end of the valve element is provided with four vanes 54 which ride in grooves 55 in the valve seat, thereby serving to guide the valve element during axial movement thereof. It is desirable to limit and to be able to adjust the extent of axial movement of the valve element. To accomplish this, the valve stem 43 is mounted in an adjustable sleeve 56 which is threadedly mounted in the plug 18. A lock nut 57 may be provided on the sleeve and suitable packing 58 utilized to seal the space between the sleeve and the plug. The sleeve is adapted to bear against a flange or collar 59 on the valve stem whereby inward movement of the sleeve 56 may be used for moving the valve stem inwardly and decreasing the extent of movement permitted the valve element. In this connection, the inner end 43' of the valve stem is adapted to bear against the upper surface of the disk 34, acting as an abutment for the valve element when the same is in the open or upper position shown.

A packing ring 60 may be utilized at the lower end of the sleeve 56 and a packing gland 61 positioned at the outer end of the sleeve.

The valve element 26 is resiliently urged away from the valve seat to the position in which it is shown in Fig. 1, by a spring 63 contained within the spring housing 28. Preferably the compression of the spring is made adjustable by providing an adjustment screw 64 extending through the end of the housing and threadedly mounted therein and a lock nut 65 on the screw. This screw bears against a cup 66 which receives the end of the spring, the opposite end of the spring bearing against the lower end of valve element 26.

In the operation of the device, assuming that the device is connected in the flow line of an oil well, for example, the spring may be adjusted to exert a desired pressure against the valve element 26. The disk 34 is adjusted so that a selected opening 35 registers with the passage 32 to permit the desired flow of fluid through the valve member when the same is closed. Assuming it is found that the well loads up or becomes overloaded excessively at a given pressure, the spring 63 may be adjusted to open the valve member to the position in which it is shown in Fig. 1, when the pressure of the well drops to the given pressure. The fluid will then flow between the valve element and the valve seat until such time as the pressure builds up sufficiently to overcome the force of the spring, at which time the valve element will close and the flow through the device be restricted to such flow as is permitted by the selected port 35 which is in registration with passage 32 of the valve element. From time to time the valve disk may be adjusted to compensate for changing conditions in the well. The sleeve 56 may also be adjusted to limit the maximum travel of the valve element under the action of the spring.

Although the invention has been particularly shown and described, it is contemplated that various changes and modifications may be made without departing from the scope thereof as indicated by the following claims.

We claim:

1. A fluid regulator adapted for connection in a pipe line or the like comprising a body having an inlet passage and having an outlet passage communicating therewith, a valve seat intermediate said passages, a valve element adapted to engage said seat and positioned on the inlet side thereof, said valve element having a bleeder passage therethrough of limited cross sectional area whereby fluid may bleed through said valve element when the same is closed, a control disk mounted on said valve element on the inlet side thereof and having ports therethrough of different cross sectional areas, said control disk being movable to bring a selected port in registration with the bleeder passage through said valve element and thereby determine the effective cross sectional area of said bleeder passage, a stem extending through said body, means connecting the inner end portion of said stem to said central disk, said means permitting relative axial movement of said stem and disk and preventing relative rotation thereof, thereby providing means for adjustably positioning said disk, and means for yieldably urging said valve element away from said seat to open position.

2. A fluid regulator adapted for connection in a pipe line or the like comprising a body having an inlet passage and having an outlet passage communicating therewith, a valve seat intermediate said passages, a valve element adapted to engage said seat and positioned on the inlet side thereof for movement axially of said seat, said valve element having a bleeder passage therethrough of limited cross-sectional area whereby fluid may bleed through said valve element when the same is closed, interengaging means on said body and said valve element to prevent rotation of said valve element, a control disk mounted on said valve element on the inlet side thereof and having ports therethrough of different cross-sectional areas, said control disk being movable to bring a selected port in registration with the bleeder passage through said valve element and thereby determine the effective cross-sectional area of said bleeder passage, a stem connected to said control disk and extending externally of said body, thereby providing means for adjustably positioning said disk, and means for axially adjusting said stem independently of its adjustment of said disk, said stem providing an abutment for said disk thereby serving to limit movement of said valve element away from said seat.

References Cited in the file of this patent

UNITED STATES PATENTS

| Number | Name | Date |
|---|---|---|
| 433,543 | Schreidt | Aug. 5, 1890 |
| 586,561 | Mosher | July 20, 1897 |
| 616,730 | Reynolds | Dec. 27, 1898 |
| 714,747 | Rowley | Dec. 2, 1902 |
| 799,670 | Reynolds | Sept. 19, 1905 |
| 809,077 | Roehl | Jan. 2, 1906 |
| 920,716 | Beckman | May 4, 1909 |
| 1,105,061 | Carpenter | July 28, 1914 |
| 1,414,323 | Barton | Apr. 25, 1922 |
| 1,828,360 | Chryst | Oct. 20, 1931 |
| 2,095,899 | Yancey | Oct. 12, 1937 |
| 2,353,161 | Heigis | July 11, 1944 |
| 2,411,667 | Mowrey | Nov. 26, 1946 |
| 2,417,217 | Schreck | Mar. 11, 1947 |
| 2,455,625 | Trantin | Dec. 7, 1948 |

FOREIGN PATENTS

| Number | Country | Date |
|---|---|---|
| 21,965 | Holland | 1930 |